US 8,099,497 B2

(12) United States Patent
Melnikov

(10) Patent No.: US 8,099,497 B2
(45) Date of Patent: Jan. 17, 2012

(54) UTILIZING REMOVABLE VIRTUAL VOLUMES FOR SHARING DATA ON A STORAGE AREA NETWORK

(75) Inventor: Moshe Melnikov, Yishay (IL)

(73) Assignee: Netapp, Inc., Sunnyvale, CA (US)

( * ) Notice: Subject to any disclaimer, the term of this patent is extended or adjusted under 35 U.S.C. 154(b) by 472 days.

(21) Appl. No.: 12/070,443

(22) Filed: Feb. 19, 2008

(65) Prior Publication Data
US 2009/0210531 A1    Aug. 20, 2009

(51) Int. Cl.
G06F 15/173 (2006.01)
(52) U.S. Cl. ........ 709/226; 709/224; 709/225; 709/203; 709/216; 709/245; 711/111; 711/113; 711/172; 711/162; 719/324; 726/22
(58) Field of Classification Search .......... 709/226, 709/214, 223, 224, 225, 203, 216; 719/324; 711/113, 111, 172, 162; 726/22
See application file for complete search history.

(56) References Cited

U.S. PATENT DOCUMENTS

| 6,557,073 | B1 * | 4/2003 | Fujiwara et al. ........... 711/111 |
| 7,254,575 | B1 * | 8/2007 | Li et al. ...................... 1/1 |
| 7,269,631 | B2 * | 9/2007 | Reuter et al. ............. 709/216 |
| 7,386,662 | B1 * | 6/2008 | Kekre et al. ............... 711/113 |
| 7,401,338 | B1 * | 7/2008 | Bowen et al. .............. 719/328 |
| 7,640,409 | B1 * | 12/2009 | Stafford et al. ............ 711/162 |
| 2003/0202443 | A1 * | 10/2003 | Nakagawa et al. ........ 369/53.18 |
| 2004/0068561 | A1 * | 4/2004 | Yamamoto et al. .......... 709/224 |
| 2004/0123053 | A1 * | 6/2004 | Karr et al. ................. 711/152 |
| 2004/0215749 | A1 * | 10/2004 | Tsao ......................... 709/220 |
| 2005/0044140 | A1 * | 2/2005 | Urabe ........................ 709/203 |
| 2005/0108375 | A1 * | 5/2005 | Hallak-Stamler .......... 709/223 |
| 2005/0262296 | A1 * | 11/2005 | Peake ........................ 711/111 |
| 2006/0129614 | A1 * | 6/2006 | Kim et al. .................. 707/202 |
| 2008/0222723 | A1 * | 9/2008 | Bhagwan et al. ............ 726/22 |
| 2009/0083501 | A1 * | 3/2009 | Friauf et al. ............... 711/158 |

* cited by examiner

Primary Examiner — Thuong Nguyen
(74) Attorney, Agent, or Firm — Haynes and Boone, LLP

(57) ABSTRACT

The present disclosure provides data sharing through virtual removable volumes. A virtual volume of a SAN (storage area network) is presented to clients as a virtual removable volume. A controlling application controls access of clients connected to the SAN to the virtual removable volume. The controlling application allows only one client at a time to access the virtual removable volume. The controlling application allows a first client to mount the virtual removable volume as a removable volume. The controlling application then causes the first client to unmount the virtual removable volume and allows a second client to mount the virtual removable volume as a removable volume. In this way, the first client and second client are able to share data via the virtual removable volume without causing corruption of data and without requiring a shared file system or physical transfer of removable media.

12 Claims, 2 Drawing Sheets

UTILIZING REMOVABLE VIRTUAL VOLUMES FOR SHARING DATA ON A STORAGE AREA NETWORK

FIELD OF THE INVENTION

This invention relates generally to storage area networks (SAN), and particularly to SAN volumes.

BACKGROUND OF THE INVENTION

A storage area network (SAN) is an architecture for attaching remote computer storage devices (e.g. disk arrays, tape libraries, and optical jukeboxes) to servers in such a way as to appear to clients that the devices are locally attached. Storage devices are presented to clients by SANs as virtual volumes. Many organizations utilize SANs to connect storage devices such as RAIDs (redundant array of independent disks) to servers. Many SAN utilize the SCSI (small computer system interface) protocol for communication between servers and storage devices.

A shared disk file system, or cluster file system, is an enterprise storage file system which can be shared (concurrently accessed for reading and writing) by multiple clients. A shared disk file system is typically utilized to share one or more virtual volumes of a SAN between multiple clients.

Removable media refers to storage media which can be removed from its reader device. Examples of removable media include floppy disks, CDs (including rewritable CDs), DVDs (including rewritable DVDs), tape cartridges, USB (universal serial bus) drives, removable hard drives, and memory cards.

SUMMARY OF THE INVENTION

Accordingly, the present disclosure provides data sharing through virtual removable volumes. A virtual volume of a SAN may be presented to clients as a virtual removable volume. A controlling application may control access of clients connected to the SAN to the virtual removable volume. The controlling application may only allow one client at a time to access the virtual removable volume. The controlling application may allow a first client to mount the virtual removable volume as a removable volume and utilize the virtual removable volume. The controlling application may then cause the first client to unmount the virtual removable volume and allow a second client to mount the virtual removable volume as a removable volume and utilize the virtual removable volume. In this way, the first client and second client may share data via the virtual removable volume without causing corruption of data and without requiring a shared file system or physical transfer of removable media.

The controlling application may comprise a distributed application executing on a number of clients and the distributed application executing on each of the clients may communicate with the distributed application executing on the other clients. If the controlling application comprises a distributed application, the controlling application may cause the clients to mount or unmount the virtual removable volume utilizing IOCTL (input/output control). Alternatively, the controlling application may comprise a centralized application executing on a centralized application server and may communicate with the number of clients. If the controlling application comprises a centralized application, the controlling application may cause the clients to mount or unmount the virtual removable volume utilizing the load eject (loej) bit in a START STOP UNIT SCSI (small computer system interface) command.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
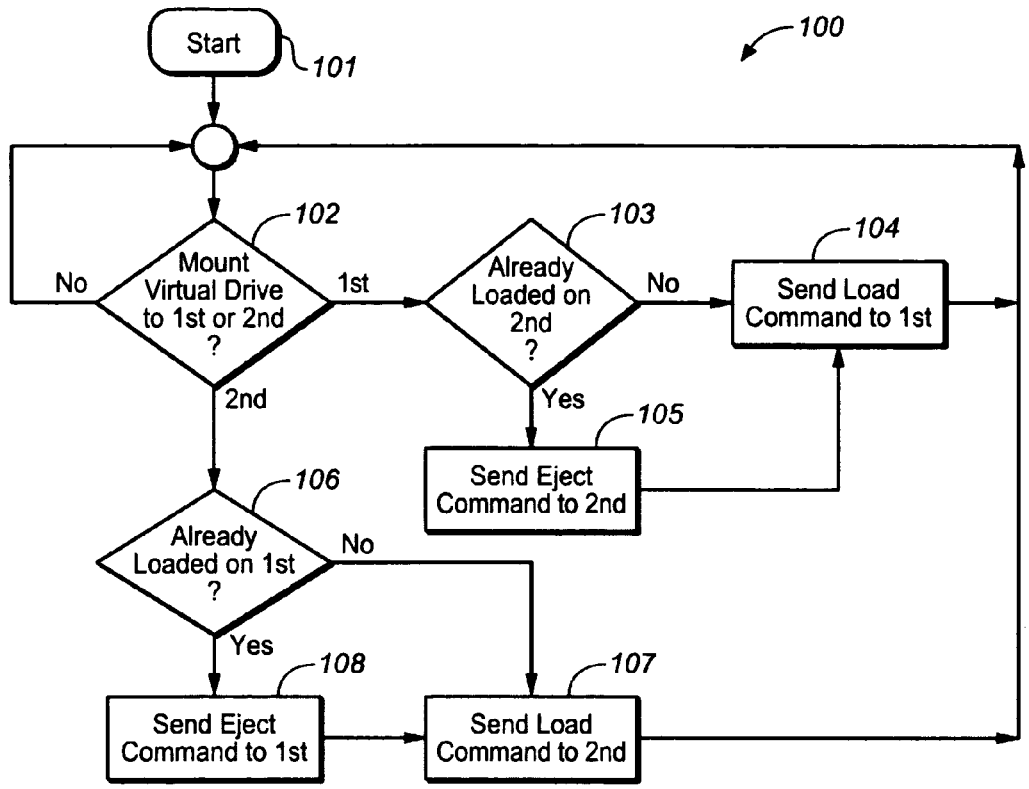
FIG. 1 is a flowchart 100 illustrating sharing of data via a virtual removable volume, in accordance with an exemplary embodiment of the present invention.

Reference will now be made in detail to the presently preferred embodiments of the invention, examples of which are illustrated in the accompanying drawings.

SANs (storage area network) typically present access to a virtual volume for reading and writing to a single client. This is due to the fact that if multiple SAN clients were to attempt concurrent access to the same virtual volume, data may rapidly become corrupt. Absent mechanisms to prevent two or more clients from performing a modification of the same part of the file system of the virtual volume at the same time, corruption of data may occur. Conventional file locking can protect files against concurrent access, but offers no protection of the file system itself.

Typically, when a virtual volume of a SAN needs to be utilized by two or more clients, a shared disk file system, or cluster file system, must be utilized. A shared file system provides currency control for the file system of the virtual volume. Each client accessing the shared file system is provided with a consistent and serializable view of the file system, thus avoiding corruption and unintended data loss. Shared file systems may distribute file system information across all the members in a cluster or may utilize a centralized file system information server. However, a shared file system may be complex and expensive, particularly when clients do not access the virtual drive simultaneously. In such a case a shared file system is cumbersome because the clients may utilize the virtual drive one at a time.

Removable media (including, but not limited to, floppy disks, CDs (including rewritable CDs), DVDs (including rewritable DVDs), tape cartridges, USB (universal serial bus) drives, removable hard drives, and memory cards) may be utilized to share data between computing devices which need non-simultaneous access to the data. However, to share the data the removable media must be mounted on a first computing device, utilized by the first computing device, physically removed from the first computing device, transferred to another computing device, and mounted on the second computing device. This process of physical transfer is cumbersome and requires manual intervention. Further, the removable media is vulnerable during transfer and loss of sensitive data may result.

A virtual volume of a SAN may be presented to clients as a virtual removable volume. A controlling application may control access of clients connected to the SAN to the virtual removable volume. The controlling application may only allow one client at a time to access the virtual removable volume. The controlling application may allow a first client to mount the virtual removable volume as a removable volume and utilize the virtual removable volume. The controlling application may then cause the first client to unmount the virtual removable volume and allow a second client to mount the virtual removable volume as a removable volume and utilize the virtual removable volume. When the first client and/or the second client receive an input/output request for the virtual removable volume and the virtual removable volume is not mounted, the first client and/or the second client may send a notification to the originator of the input/output request that the virtual removable volume is unavailable. In this way, the first client and second client may share data via the virtual removable volume without causing corruption of data and without requiring a shared file system or physical transfer of removable media.

FIG. 1 is a flowchart 100 illustrating sharing of data via a virtual removable volume, in accordance with an exemplary embodiment of the present invention. From a start 101, the controlling application determines 102 whether to mount the virtual removable volume on a first computing device or a second computing device. The controlling application may determine to mount the virtual volume on the first computing device or the second computing device based on one or more received requests for the virtual removable volume. The received requests for the virtual volume may originate from the first computing device and/or the second computing device. Alternatively, the controlling application may determine to mount the virtual volume on the first computing device or the second computing device based on a time schedule detailing when the first computing device is to have access to the removable virtual volume and/or when the second computing device is to have access to the removable virtual volume. Alternatively, the controlling application may determine to mount the virtual volume on the first computing device or the second computing device based on a time limit where the first computing device or the second computing device may be allowed to access the removable virtual volume for the duration of the time limit before the other computing device is allowed to access the removable virtual volume. If the controlling application determines to mount the virtual removable drive on the first computing device, the controlling application may determine 103 whether the virtual removable drive is already mounted on the second computing device. If the virtual removable drive is already mounted on the second computing device, the controlling application may send an eject command to the second computing device 105 and the second computing device may unmount the virtual removable drive in response to receiving the eject command. The controlling application may then send a load command to the first computing device 104 and the first computing device may mount the virtual removable drive in response to receiving the load command. If the virtual removable drive is not already mounted on the second computing device, the controlling application may send a load command to the first computing device 104 and the first computing device may mount the virtual removable drive in response to receiving the load command. The controlling application then determines 102 whether to mount the virtual removable volume on the first computing device or the second computing device.

Alternatively, if the controlling application determines to mount the virtual removable drive on the second computing device, the controlling application may determine 106 whether the virtual removable drive is already mounted on the first computing device. If the virtual removable drive is already mounted on the first computing device, the controlling application may send an eject command to the first computing device 108 and the first computing device may unmount the virtual removable drive in response to receiving the eject command. The controlling application may then send a load command to the second computing device 107 and the second computing device may mount the virtual removable drive in response to receiving the load command. If the virtual removable drive is not already mounted on the first computing device, the controlling application send a load command to the second computing device 107 and the second computing device may mount the virtual removable drive in response to receiving the load command. The controlling application then determines 102 whether to mount the virtual removable volume on the first computing device or the second computing device.

Figure 2:
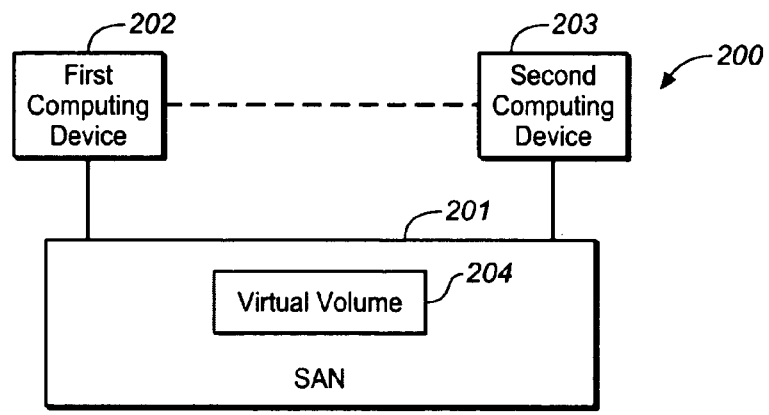
FIG. 2 is a block diagram illustrating a system for sharing of data via a virtual removable volume, in accordance with an exemplary embodiment of the present invention.

FIG. 2 illustrates a system 200 for sharing of data via a virtual removable volume, in accordance with an exemplary embodiment of the present invention. The system 200 includes a SAN 201 with a virtual volume 204, a first computing device 202 communicably connected to the SAN 201, and a second computing device 203 communicably coupled to the SAN 201. In this embodiment the controlling application may comprise a distributed application executing on the first computing device 202 and the second computing device 203 and the distributed application executing on each of the first computing device 202 and the second computing device 203 may communicate with the distributed application executing on the other computing device. The distributed application executing on each of the first computing device 202 and the second computing device 203 may communicate with the distributed application executing on the other computing device via the SAN 201 and/or the first computing device 202 and the second computing device 203 may be communicably connected and the distributed application executing on each of the first computing device 202 and the second computing device 203 may communicate with the distributed application executing on the other computing device directly. A distributed application is an application made up of distinct components executing in separate runtime environments connected via a network. When the controlling application comprises a distributed application executing on the first computing device 202 and the second computing device 203, the load and eject commands the controlling application may send to the first computing device 202 and the second computing device 203 may be implemented utilizing IOCTL (input/output control). IOCTL may comprise part of a user-to-kernel interface of the first computing device and/or the second computing device. IOCTL may be typically employed to allow userspace code to communicate with hardware devices or kernel components. The controlling application may comprise computer-executable instructions embodied in a tangible media (including, but not limited to, a main memory, a cache memory, a hard drive, a flash memory, a floppy disk, a CD, a DVD, and/or a memory card) of the first computing device and/or the second computing device and the first computing device and/or the second computing device may execute the computer-executable instructions.

Figure 3:
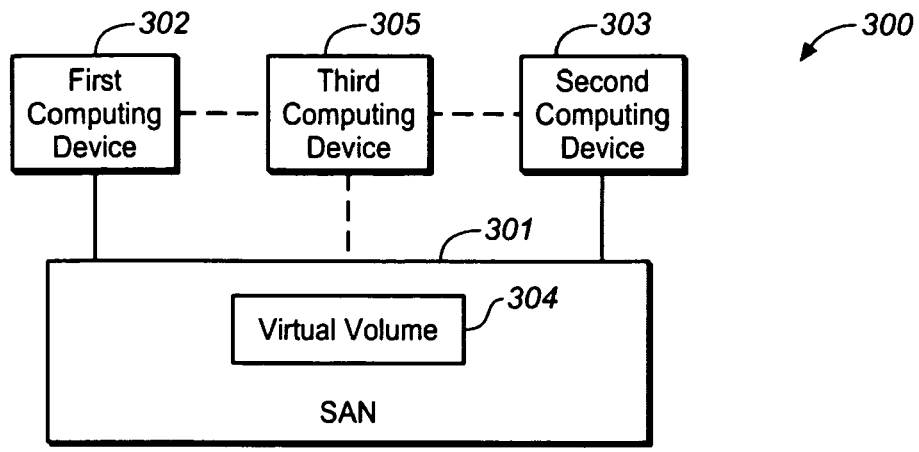
FIG. 3 is a block diagram illustrating a system for sharing of data via a virtual removable volume, in accordance with an alternative embodiment of the present invention.

FIG. 3 illustrates a system 300 for sharing of data via a virtual removable volume, in accordance with an alternative embodiment of the present invention. The system 300 includes a SAN 301 with a virtual volume 304, a first computing device 302 communicably connected to the SAN 301, a second computing device 303 communicably coupled to the SAN 301, and a third computing device 305 communicably coupled to the SAN 301. In this embodiment the controlling application may comprise a centralized application executing on the third computing device 305 and may communicate with the first computing device 302 and the second computing device 303. The centralized application executing on the third computing device 305 may communicate with the first computing device 302 and the second computing device 303 via the SAN 301 and/or the third computing device 305 may be communicably connected to the first computing device 302 and the second computing device 303 and the centralized application executing on the third computing device 305 may communicate with the first computing device 302 and the second computing device 303 directly. When the controlling application comprises a centralized application executing on the third computing device 305, the load and eject commands the controlling application may send to the first computing device 302 and the second computing device 303 may be implemented utilizing the load eject (loej) bit in a START STOP UNIT SCSI (small computer system interface) command as specified in SCSI-3 Block commands. The START STOP UNIT SCSI command is used to control the motor of a rotary device such as a SCSI disk drive and/or to load or eject removable media. The controlling application may comprise computer-executable instructions embodied in a tangible media (including, but not limited to, a main memory, a cache memory, a hard drive, a flash memory, a floppy disk, a CD, a DVD, and/or a memory card) of the third computing device and the third computing may execute the computer-executable instructions.

Figure 4:
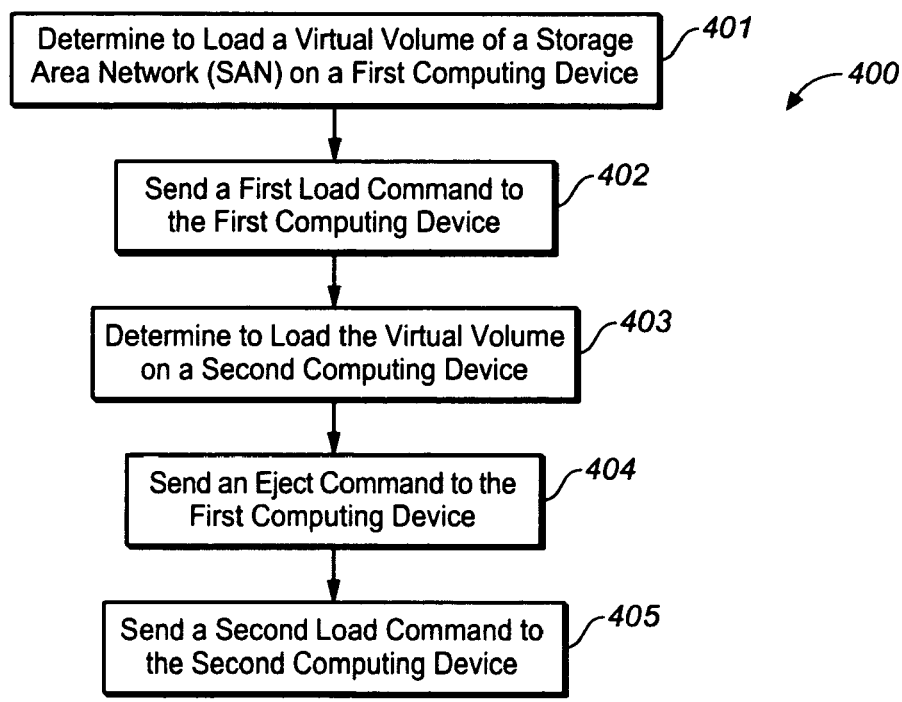
FIG. 4 is a flow chart of a method for sharing of data via a virtual removable volume, in accordance with an exemplary embodiment of the present invention.

Referring now to FIG. 4, a method 400 for sharing of data via a virtual removable volume, in accordance with an exemplary embodiment of the present invention, is illustrated. In step 401, determine to load a virtual volume of a storage area network (SAN) on a first computing device. Determining to load the virtual volume of the SAN on the first computing device may utilize a controlling application. The determination to load the virtual volume of the SAN on the first computing device may be based on one or more received requests for the virtual removable volume. The received requests for the virtual volume may originate from the first computing device. Alternatively, the determination to load the virtual volume of the SAN on the first computing device may be based on a time schedule detailing when the first computing device is to have access to the removable virtual volume. Alternatively, the determination to load the virtual volume of the SAN on the first computing device may be based on the expiration of a time limit. In step 402, send a first load command to the first computing device. Sending the first load command to the first computing device may utilize the controlling application. Sending the first load command to the first computing device may cause the first computing device to mount the virtual volume in response to receiving the first load command. The first load command may be implemented utilizing IOCTL if the controlling application comprises a distributed application. The first load command may be implemented utilizing the load eject (loej) bit in a START STOP UNIT SCSI command if the controlling application comprises a centralized application. In step 403, determine to load the virtual volume of a SAN on a second computing device. Determining to load the virtual volume of the SAN on the second computing device may utilize the controlling application. The determination to load the virtual volume of the SAN on the second computing device may be based on one or more received requests for the virtual removable volume. The received requests for the virtual volume may originate from the second computing device. Alternatively, the determination to load the virtual volume of the SAN on the second computing device may be based on a time schedule detailing when the second computing device is to have access to the removable virtual volume. Alternatively, the determination to load the virtual volume of the SAN on the second computing device may be based on a time limit where the first computing device or the second computing device may be allowed to access the removable virtual volume for the duration of the time limit before the other computing device is allowed to access the removable virtual volume. In step 404, send an eject command to the first computing device. Sending the eject command to the first computing device may utilize the controlling application. Sending the eject command to the first computing device may cause the first computing device to unmount the virtual volume in response to receiving the eject command. The eject command may be implemented utilizing IOCTL if the controlling application comprises a distributed application. The eject command may be implemented utilizing the load eject (loej) bit in a START STOP UNIT SCSI command if the controlling application comprises a centralized application. In step 405, send a second load command to the second computing device. Sending the second load command to the second computing device may utilize the controlling application. Sending the second load command to the second computing device may cause the second computing device to mount the virtual volume in response to receiving the second load command. The second load command may be implemented utilizing IOCTL if the controlling application comprises a distributed application. The second load command may be implemented utilizing the load eject (loej) bit in a START STOP UNIT SCSI command if the controlling application comprises a centralized application.

Although the above has been illustrated and described in the context of two computing devices, it should be understood that the any number of computing devices may be utilized, such as three or twenty, without departing from the scope of the present disclosure.

The present disclosure may present virtual volume of a SAN to clients as a virtual removable volume. The present disclosure may utilize a controlling application to control access of clients connected to the SAN to the virtual removable volume. The controlling application may only allow one client at a time to access the virtual removable volume. The controlling application may allow a first client to mount the virtual removable volume as a removable volume and utilize the virtual removable volume. The controlling application may then cause the first client to unmount the virtual removable volume and allow a second client to mount the virtual removable volume as a removable volume and utilize the virtual removable volume. In this way, the present disclosure allows the first client and second client to share data via the virtual removable volume without causing corruption of data and without requiring a shared file system or physical transfer of removable media.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method, comprising:
    determining to load a virtual volume of a storage area network (SAN) on a first computing device communicably connected to the SAN utilizing a controlling application;
    sending a first load command to the first computing device, causing the virtual volume to mount on the first computing device, utilizing the controlling application;
    determining to load the virtual volume on a second computing device communicably connected to the SAN utilizing the controlling application;
    sending an eject command to the first computing device, causing the virtual volume to unmount from the first computing device, utilizing the controlling application; and
    sending a second load command to the second computing device, causing the virtual volume to mount on the second computing device, utilizing the controlling application,
    wherein the controlling application is a central controlling application executing on a third computing device communicatively coupled to the first computing device and the second computing device,
    wherein one selected from the first load command, the second load command, and the eject command comprise a SCSI (Small Computer System Interface) command, and the SCSI command includes a load eject (loej) bit in an START STOP UNIT SCSI command.

2. The method as claimed in claim 1, wherein the first computing device shares data with the second computing device via the virtual volume.

3. The method as claimed in claim 1, wherein the sending a load command to the first computing device causing the virtual volume to mount on the first computing device utilizing the controlling application, comprises:
    sending the first load command to a driver of the first computing device, causing the driver of the first computing device to mount the virtual volume onto the first computing device, utilizing the controlling application.

4. The method as claimed in claim 1, wherein the sending an eject command to the first computing device, causing the virtual volume to unmount from the first computing device, utilizing the controlling application, comprises:
    sending the eject command to a driver of the first computing device, causing the driver of the first computing device to unmount the virtual volume from the first computing device, utilizing the controlling application.

5. The method as claimed in claim 1, wherein the sending a second load command to the second computing device, causing the virtual volume to mount on the second computing device, utilizing the controlling application, comprises:
    sending the second load command to a driver of the second computing device, causing the driver of the second computing device to mount the virtual volume onto the second computing device, utilizing the controlling application.

6. The method as claimed in claim 1, wherein the sending an eject command to the first computing device causes the first computing device, when the first computing device receives an input/output request for the virtual volume, to inform an originator of the input/output request that the virtual volume is unavailable.

7. Computer-executable instructions, embodied in a non-transitory tangible medium, for performing a method comprising:
    determining to load a virtual volume of a storage area network (SAN) on a first computing device communicably connected to the SAN utilizing a controlling application;
    sending a first load command to the first computing device, causing the virtual volume to mount on the first computing device, utilizing the controlling application;
    determining to load the virtual volume on a second computing device communicably connected to the SAN utilizing the controlling application;
    sending an eject command to the first computing device, causing the virtual volume to unmount from the first computing device, utilizing the controlling application; and
    sending a second load command to the second computing device, causing the virtual volume to mount on the second computing device, utilizing the controlling application,
    wherein the controlling application is a central controlling application executing on a third computing device communicatively coupled to the first computing device and the second computing device,
    wherein one selected from the first load command, the second load command, and the eject command comprise a SCSI (Small Computer System Interface) command, and the SCSI command includes a load eject (loej) bit in an START STOP UNIT SCSI command.

8. The computer-executable instructions of claim 7, wherein the first computing device shares data with the second computing device via the virtual volume.

9. The computer-executable instructions of claim 7, wherein the sending a load command to the first computing device, causing the virtual volume to mount on the first computing device, utilizing the controlling application, comprises:
    sending the first load command to a driver of the first computing device, causing the driver of the first computing device to mount the virtual volume onto the first computing device, utilizing the controlling application.

10. The computer-executable instructions of claim 7, wherein the sending an eject command to the first computing device, causing the virtual volume to unmount from the first computing device, utilizing the controlling application, comprises:
    sending the eject command to a driver of the first computing device, causing the driver of the first computing device to unmount the virtual volume from the first computing device, utilizing the controlling application.

11. The computer-executable instructions of claim 7, wherein the sending a second load command to the second computing device, causing the virtual volume to mount on the second computing device, utilizing the controlling application, comprises:

sending the second load command to a driver of the second computing device, causing the driver of the second computing device to mount the virtual volume onto the second computing device, utilizing the controlling application.

12. The computer-executable instructions of claim 7, wherein the sending an eject command to the first computing device causes the first computing device, when the first computing device receives an input/output request for the virtual volume, to inform an originator of the input/output request that the virtual volume is unavailable.

* * * * *